(12) United States Patent
Clark

(10) Patent No.: US 8,108,839 B2
(45) Date of Patent: Jan. 31, 2012

(54) METHOD AND APPARATUS FOR TRACING EXECUTION OF COMPUTER PROGRAMMING CODE USING DYNAMIC TRACE ENABLEMENT

(75) Inventor: Timothy Pressler Clark, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1401 days.

(21) Appl. No.: 11/565,334

(22) Filed: Nov. 30, 2006

(65) Prior Publication Data

US 2008/0134148 A1    Jun. 5, 2008

(51) Int. Cl.
*G06F 9/44* (2006.01)
*G06F 11/00* (2006.01)
(52) U.S. Cl. .................... 717/128; 717/130; 714/45
(58) Field of Classification Search .......... None
See application file for complete search history.

(56) References Cited

U.S. PATENT DOCUMENTS

| | | | | |
|---|---|---|---|---|
| 3,659,272 A * | 4/1972 | Price et al. | ...................... | 714/45 |
| 6,151,638 A * | 11/2000 | Hale et al. | ..................... | 719/312 |
| 6,158,024 A * | 12/2000 | Mandal | ............................ | 714/37 |
| 6,728,949 B1 * | 4/2004 | Bryant et al. | .................. | 717/127 |
| 7,386,686 B2 * | 6/2008 | Wu et al. | ...................... | 711/147 |
| 2002/0199172 A1 * | 12/2002 | Bunnell | ........................ | 717/128 |
| 2003/0088854 A1 * | 5/2003 | Wygodny et al. | ............ | 717/130 |
| 2006/0200806 A1 * | 9/2006 | Tasinga | .......................... | 717/128 |

* cited by examiner

*Primary Examiner* — James D Rutten
(74) *Attorney, Agent, or Firm* — Roy W. Truelson

(57) ABSTRACT

A computer program is traced by associating a trigger with at least one code location, and upon encountering the trigger during execution, selectively enabling trace data collection data at subsequent traceable events. Preferably, collection of trace data is enabled only for procedure instances active (i.e., currently executing or on the call stack) at the time that the trigger is encountered. Preferably, a special environmental flag is set on encountering the trigger, saved in each current stack frame, reset on calling any new procedure, and restored from the stack on return from a procedure. Collection of trace data on a traceable event (such as an explicit trace statement in the code) is conditioned on the state of the special environmental flag.

13 Claims, 8 Drawing Sheets

METHOD AND APPARATUS FOR TRACING EXECUTION OF COMPUTER PROGRAMMING CODE USING DYNAMIC TRACE ENABLEMENT

FIELD OF THE INVENTION

The present invention relates to digital data processing, and in particular to methods and apparatus for analyzing the execution of computer programming code by tracing.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed.

The evolution of computer software has led to the creation of sophisticated software development environments. These environments typically contain a range of tools for supporting the development of software in one or more high-level languages. For example, interactive source editors support the initial generation of source code by a developer. Source databases may support collections of source modules or source objects, which serve as the component parts of software applications. Front-end compiler/debuggers perform simple semantic verification of the source and reduction to a standard form. Back-end or optimizing compilers generate machine executable object code from the standard form, and may optimize the performance of this code using any of various optimization techniques. Build utilities assemble multiple object code modules into fully functioning computer programs.

Among the tools available in many such programming development environments are a range of diagnostic and debug tools for analyzing the execution of computer programming code, particularly compiled code. A common analytical technique is the tracing of code execution using one or more tracepoints. A tracepoint is a location in a code sequence at which certain state data is saved for later analysis. Upon encountering a tracepoint during execution, the corresponding state data in saved in a designated area of memory referred to as a trace buffer, and the program continues execution. The contents of the trace buffer can later be examined to analyze program behavior, determine the cause of program errors, and so forth.

One problem with tracing is that it tends to produce a very large volume of traced state data. In many environments, it is necessary for various reasons of memory and storage management to limit the amount of trace data which is saved, either in memory or storage. Even where not strictly required by the environment, it is often desirable to limit the amount of trace data saved, if for no other reason than to reduce the difficulty of subsequent analysis.

Trace data can be limited in a variety of ways. The user may limit the number of tracepoints and/or the amount of state data saved at each trace point to reduce the total volume of collected data. Alternatively or additionally, a trace buffer may hold a limited volume of most recently gathered trace data, older data being overwritten as new trace data is accumulated. As a further alternative, tracepoints can be conditionally enabled, so that upon encountering a tracepoint, data is only collected if some condition is met.

Properly used, these and other conventional techniques provide the program developer with a range of capabilities for tracing the behavior of a program. However, there are still various programming circumstances which are difficult to adequately trace using conventional trace tools.

One such circumstance is a situation in which a repetitively called procedure produces an unexpected result on infrequent calls of the procedure. For example, a calling procedure P contains a loop in which a called procedure Q is invoked, the loop iterating many times. On infrequent occasions, the called procedure Q produces an unexpected result, as by branching to or calling an infrequently used code path. In such a circumstance, it may be desirable to understand the behavior of procedure P, or other procedures which called P, which produced the unexpected result in Q. However, if a trace buffer has limited size, it is possible that, when the critical point is encountered, the trace buffer will be filled with data from multiple invocations of procedure Q, effectively overwriting any previously traced data from procedure P or the procedures which called it. Alternatively, the need to collect large volumes of trace data for each invocation of Q, although many produce no abnormal result, can affect the number of tracepoints and volume to state data at each point which the programmer decides to collect.

As programs grow in size and complexity, the difficulty of isolating trace data to significant conditions and eliminating from the trace that data which is not significant to the problem is likely to increase. A need exists for a more effective trace tools which will assist the programmer selectively cull relevant trace data from the execution of a program.

SUMMARY OF THE INVENTION

A computer program is traced by defining a triggering event, and upon the occurrence of the triggering event during execution of the program, selectively enabling the collection of trace data at one or more subsequent traceable events. Preferably, collection of trace data is enabled only for procedure instances active (i.e., currently executing or on the call stack) at the time that the trigger is encountered.

In the preferred embodiment, encountering a trigger during execution causes tracing based on the trigger to be activated for the currently executing procedure instance, and a trace indicator to be set in each stack frame on the call stack. For this reason, tracing as described herein is sometimes referred to herein as stack-scoped tracing, it being understood that the present invention is not necessarily limited to embodiments in which tracing is activated for stack frames on a current call stack. Execution then continues normally from the trigger point. As each procedure in the call stack returns, the trace indicator in the call stack is inspected, and stack-scoped tracing is activated accordingly. Actual collection of trace data occurs upon the occurrence of a traceable event in any instance of a procedure in which stack-scoped tracing is activated. A traceable event is typically the encountering of a tracepoint in the program code during execution, but in some debug environments it may also or alternatively be responsive to user-specified traceable events monitored by a trace utility (such as upon calling or returning from a procedure).

In the preferred embodiment, stack-scoped tracing is only one of multiple possible tracing techniques which may be used concurrently. A tracepoint may conditionally collect trace data depending on whether stack-scoped tracing is activated and/or depending on any of various other conditions, as known in conventional tracing techniques.

Triggering collection of trace data and subsequently collecting trace data for selective instances of called procedures can, if used appropriately, substantially reduce the volume of irrelevant trace data collected from procedure instances unrelated to a programmer's area of interest. This in turn may facilitate more thorough and complete collection of state data from procedure instances related to programmer's area of interest, reduce the volume of data the programmer has to analyze, and reduce to overhead burden of collecting trace data during program execution. This new capability therefore makes it easier to debug and correct computer programs.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Environment Overview

The present invention relates to computer program analysis using trace data. The collection of trace data is only one of a number of tools available to a programmer or other user to analyze and debug computer programs. Trace data may be collected as part of the initial development process for a computer program, or may be collected after a program has been released for productive use, to understand program behavior or identify program errors. Typically, tracing involves placing multiple tracepoints within the code, each tracepoint causing certain state data to be collected. However, limited trace data may alternatively be collected without explicit tracepoints in the code by using certain trace tools, which cause data to be collected upon the occurrence of specified events, such as procedure calls, returns, interrupts, etc. Any of these are referred to herein as traceable events. During execution, upon the occurrence of a traceable event, state data may be saved for later analysis.

Traceable events often have conditions associated with them, so that trace data is not always saved upon occurrence of the traceable event. One of the most common conditions is a global tracing switch, which the user can turn on or off. In general, tracing requires substantial processor, memory and other overhead, so that system performance may be degraded by tracing. In normal operation, tracing will typically be turned off to reduce overhead. When the user desires to collect trace data, as when attempting to debug an error or characterize program performance, he can turn tracing on. Other conditions may be associated with traceable events.

In accordance with the preferred embodiment of the present invention, a condition is associated with each of multiple traceable events in order to trace selective occurrences of traceable events. It should be understood that this could be, but that it is not necessarily, the only condition associated with the traceable events. In accordance with the preferred embodiment, each of multiple traceable events may have one or more other conditions associated with it, which may be joined by logical operators such as AND and OR. Thus, in one aspect of the present invention it is intended to supplement conventional tracing capabilities by providing additional conditions upon the collection of trace data which will be useful in some, but not necessarily all, circumstances.

Detailed Description

Figure 1:
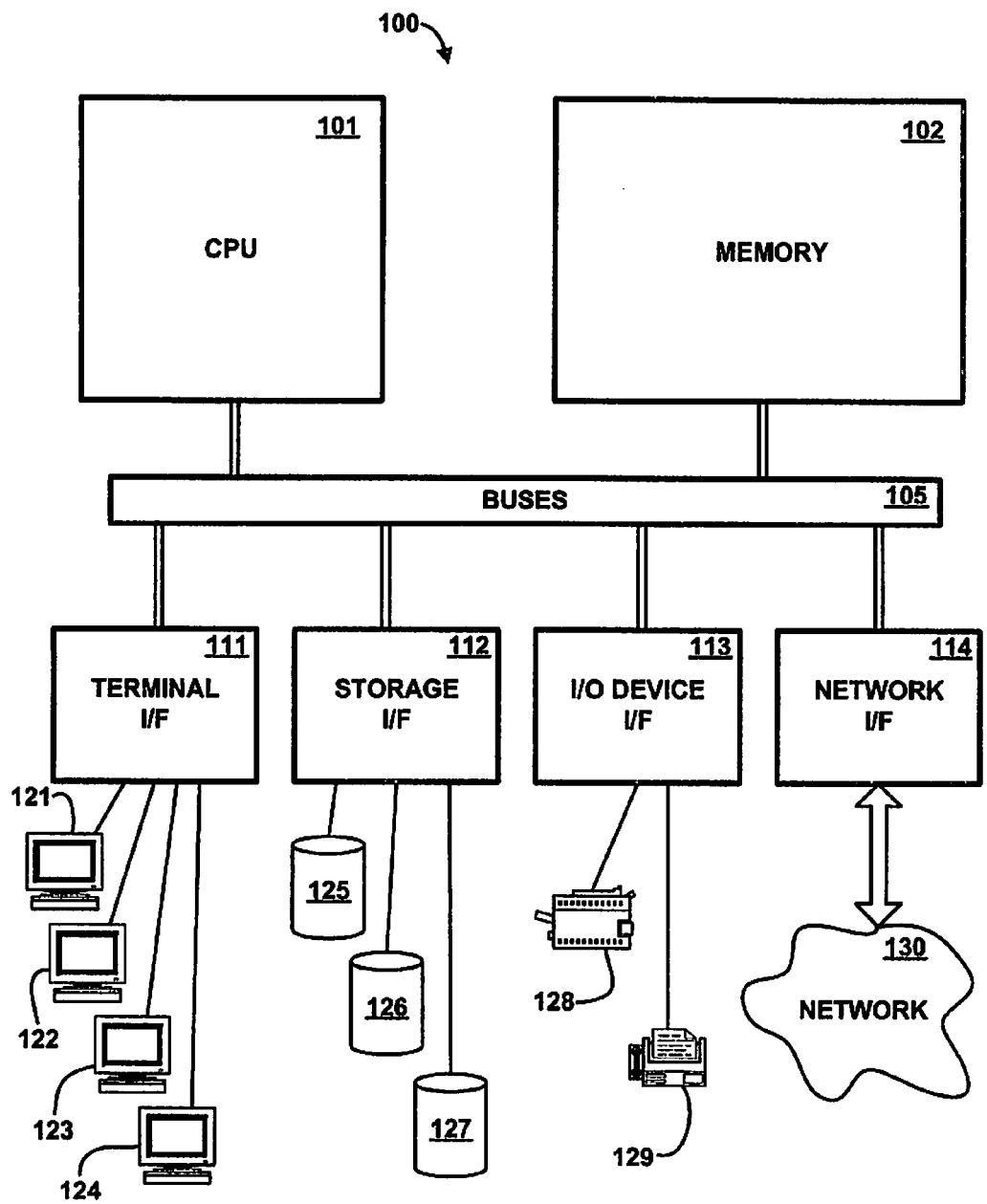
FIG. 1 is a high-level block diagram of the major hardware components of a computer system for analyzing computer programming code by collecting trace data using dynamic trace enablement, according to the preferred embodiment of the present invention.

Referring to the Drawing, wherein like numbers denote like parts throughout the several views, FIG. 1 is a high-level representation of the major hardware components of a computer system 100 for use in analyzing computer programming code by collecting trace data using dynamic trace enablement, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communications among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM i/Series™ architecture, it being understood that the present invention could be implemented on other computer systems.

Figure 2:
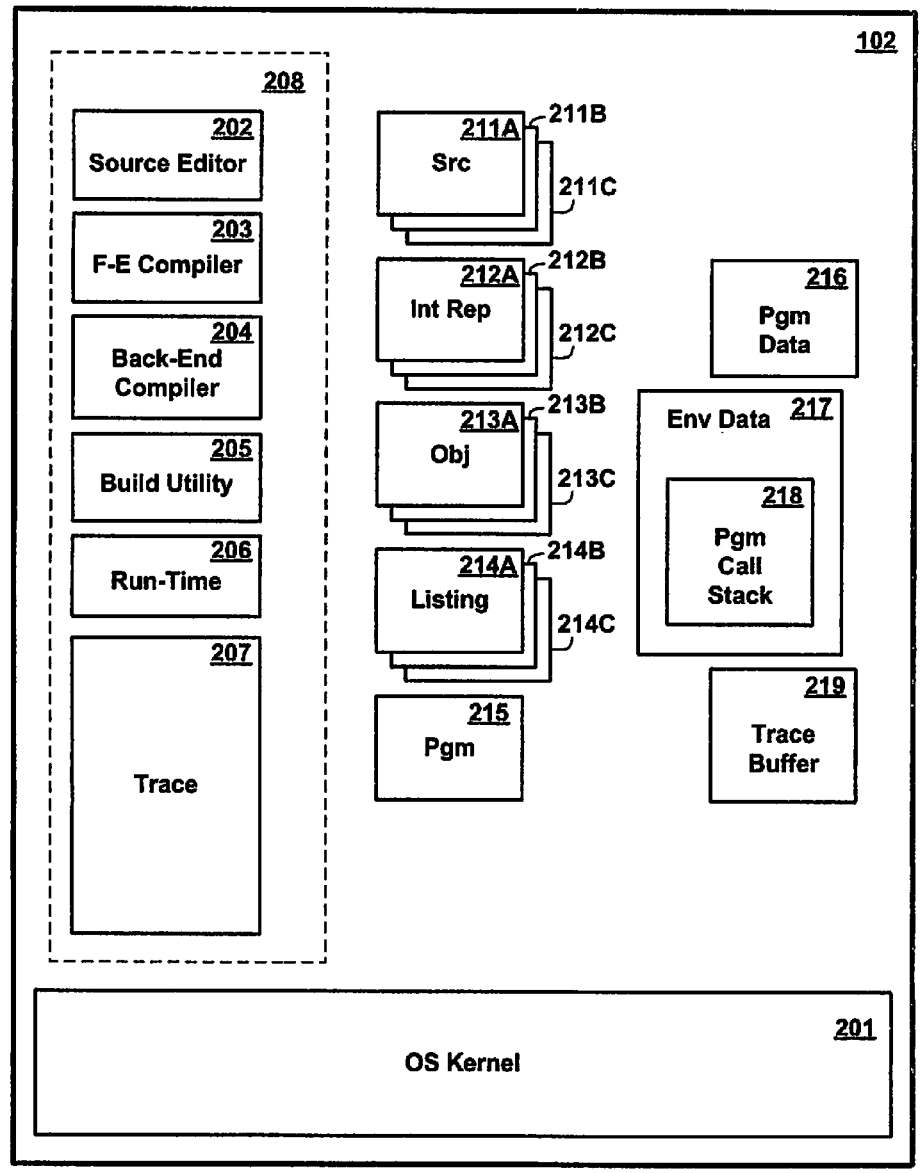
FIG. 2 is a conceptual illustration of the major software components of a computer system of FIG. 1, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Various programs such as source editor 202, front-end compiler 203, back end (optimizing) compiler 204, build utility 205, run time support 206, and trace utility 207 form an integrated development environment 208 for producing executable computer programming code.

Source editor 202 is an executable computer program which supports the creation and editing of source code for other computer programs, using any of various known techniques. Source files 211A-211C (herein generically referred to as feature 211) are files containing source code which are created and edited using source editor 202. Source editor 202 may be a general-purpose free-form text editor for editing text files, which is non-specific to a programming language, or may a special-purpose source editor for one or more programming languages.

Front-end compiler 203 is an executable program which converts source files 211A-C to corresponding files in an intermediate representation 212A-212C (herein generically referred to as feature 212). Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware.

Back-end compiler 204 is an executable computer program which compiles the intermediate representation files 212A-C into corresponding object code modules 213A-213C (herein generically referred to as feature 213) of executable statements. Typically, back-end compiler has the capability to perform certain code optimizations, although it need not necessarily be an optimizing compiler. Optimization is often disabled during development, in order to obtain a closer correlation of source statements to compiled object code. Back-end compiler further has the capability to generate corresponding listing files 214A-214C (herein generically referred to as feature 214) as part of the compilation process. A listing 214 correlates instructions and variable locations in the executable object code with statements and variables in the intermediate representation 212 or source representation 202.

Build utility 205 is an executable computer program which builds a program 215 developed by development environment 208 by incorporating or binding multiple object code modules. Run-time support module 206 is low-level executable program code which provides necessary execution support functions 100.

Optional trace utility 207 is executable computer programming code which is used to assist a programmer in tracing execution of another program (e.g. program 215). Trace utility 207 may allow a programmer to specify one or more traceable events for collecting trace data, data to be collected at each such event, and conditions on collection of trace data. The trace utility may alternatively allow a programmer to specify a one or more triggering events for triggering stack-scoped tracing. Trace utility monitors execution of the program being traced, and upon detection of a specified traceable event or trigger, takes appropriate action to collect trace data or enable stack-scoped tracing, as described further herein.

Although source editor 202, front-end compiler 203, back-end compiler 204, build utility 205, run-time support 206, and trace utility 207 are shown as separate entities in FIG. 2, it will be understood that these are often packaged together as part of an integrated application development environment 208. Furthermore, it will be appreciated that some or all of these functions, and in particular run-time support, are often incorporated into an operating system. Furthermore, although separate front-end 203 and back-end 204 compilers are represented in FIG. 2 with a corresponding intermediate code representation 212, it will be appreciated that in some environments, code is compiled directly from source to executable object by a single compilation module, without any intermediate representation, and further that there could be multiple intermediate versions and corresponding compilation steps. Additionally, although functional modules 202-207 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling, building and analysis of code might be performed by a centralized server.

Although a certain number of source modules, object modules, application programs and service programs are shown in the conceptual representation of FIG. 2, it will be understood that the actual number of such entities may vary, and in particular, that in a complex program development environment, the number of such entities is typically much larger. Furthermore, it will be understood that various entities could be stored in a distributed fashion on multiple computer systems.

During execution of program 215 (which is often, although not necessarily, performed on a different computer system from that on which program 215 was developed), the program generates and/or accesses various program data 216 related to its function, represented generally as feature 216, it being understood that program data may have a complex structure. Program 215 also generally calls multiple procedures or subroutines, and that these may be called in a hierarchical tree of calls, and may be called recursively or iteratively, as is known in the art. Program 215 and/or operating system 201 maintains environmental state data 217 which includes, among other things, program call stack 218. Program call stack 218 contains one or more stack frames, each corresponding to an active procedure or a procedure which called another procedure and which must later be returned to, as is known in the art. If execution of program 215 is being traced, memory 102 may further contain a trace buffer 219 containing data program state data collected at one or more traceable events.

While the software components of FIG. 2 are shown conceptually as residing in memory 102, it will be understood that in general the memory of a computer system will be too small to hold all programs and other data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
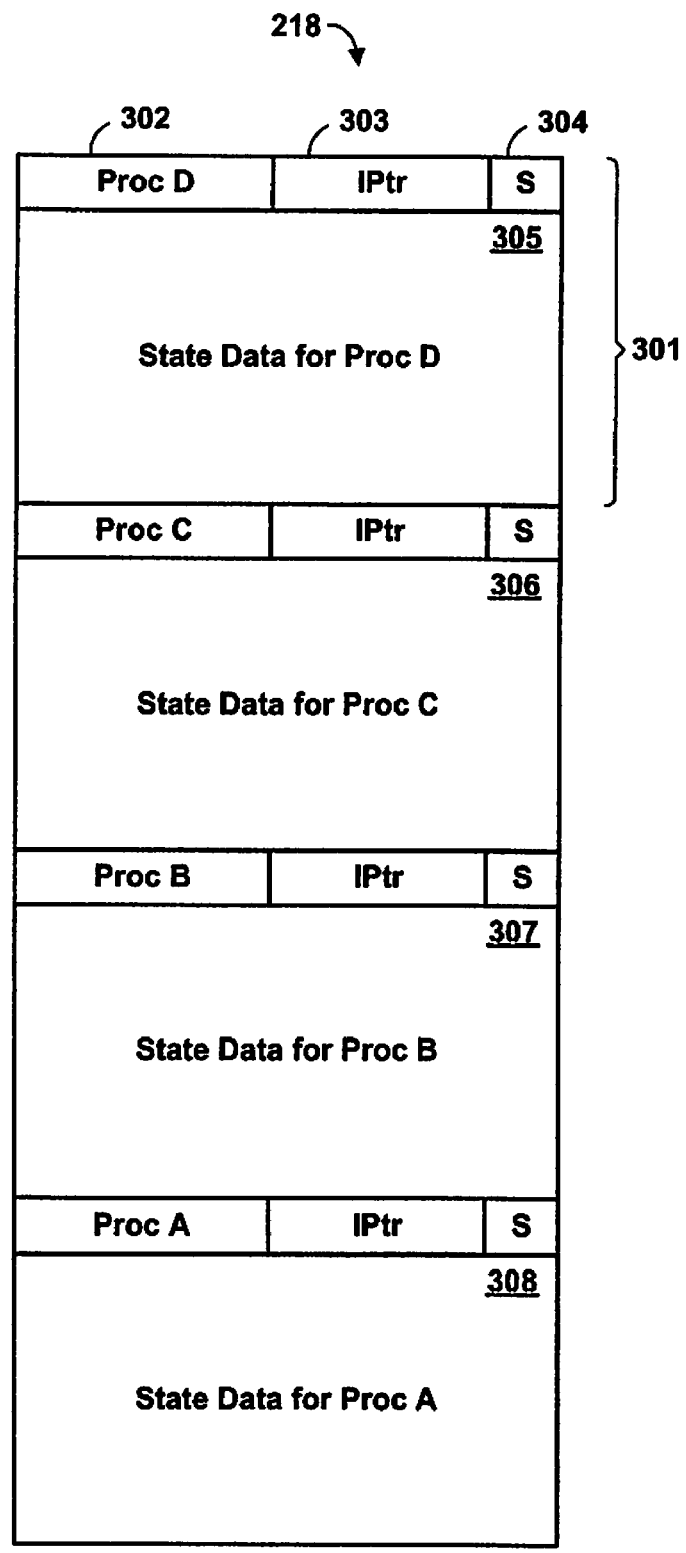
FIG. 3 is a conceptual illustration showing the structure of a call stack, according to the preferred embodiment.

FIG. 3 is a conceptual illustration showing a structure of program call stack 218, according to the preferred embodiment. Call stack 218 is a dynamically maintained data structure containing a variable number of stack frames 301, each frame corresponding to a respective instance of a procedure (calling procedure) which has previously called another instance of a procedure (called procedure), and which must be returned to when the called procedure has finished execution, with the frame at the top of the stack corresponding to the currently active procedure. The called procedure could be another instance of the same procedure as the calling procedure, as is known in the art. Stack frames are placed on the stack when a procedure is called, and removed from stack in reverse order of placement, resulting in a last in, first out (LIFO) data structure.

Each stack frame 301 contains a procedure identifier 302 which identifies the applicable procedure; an instruction pointer 303 identifying, in the case of a procedure instance which has called another procedure instance and must be returned to, the instruction location within the procedure at which the call was issued; a stack-scoped trace enable flag 304; and additional state data 305 of the procedure instance, such as may be necessary to restore the calling procedure instance's state upon return from the called procedure. Stack-scoped trace enable flag 304 is used to identify those procedure instances to be traced responsive to a stack-scoped trace trigger, as explained more fully herein. Preferably, stack-scoped trace enable flag 304 is initialized to 'false' when a procedure is originally instantiated It may subsequently be set to 'true' as a result of a trigger being encountered while executing the procedure instance (or any procedure instance called by it).

It should be understood that FIG. 3 is a conceptual illustration for purposes of understanding stack-scoped trace enablement according to the preferred embodiment, and that the actual structure of a call stack may be more complex. In particular, stack frames need not be in contiguous memory locations, and may contain additional data needed for stack maintenance and so forth.

In accordance with the preferred embodiment, a programmer or other user traces execution of code by defining multiple traceable events, which are preferably tracepoints inserted in the source code, at least some of which are conditioned on the state of a stack-scoped trace enable. The programmer also defines at least one stack-scoped trace trigger for enabling tracing upon selective occurrences of traceable events during execution, which is also preferably a special instruction inserted in the source code. The program is then executed. During execution, upon initial execution of the root procedure instance, or upon calling any new procedure instance, the stack-scoped trace enable flag 304 for the procedure instance is set to 'false'. If a stack-scoped trace trigger is encountered during execution, the stack-scoped trace enable flag 304 is set to 'true' for each stack frame on the stack at the time the trigger was encountered, i.e., for the active stack frame (of the currently executing procedure instance) and for all stack frames of calling procedure instances which must later be returned to. Upon return from a procedure, execution in the calling procedure instance resumes using the previously saved state values, including the state of the previously saved stack-scoped trace enable flag. If a traceable event is encountered at any time during execution and the traceable event is conditioned on stack-scoped tracing, then the event is traced (i.e., trace data is collected) depending on the state of the stack-scoped trace enable flag 304 for the then active procedure instance. This process is explained in further detail, with reference to the accompanying figures, below.

Figure 4:
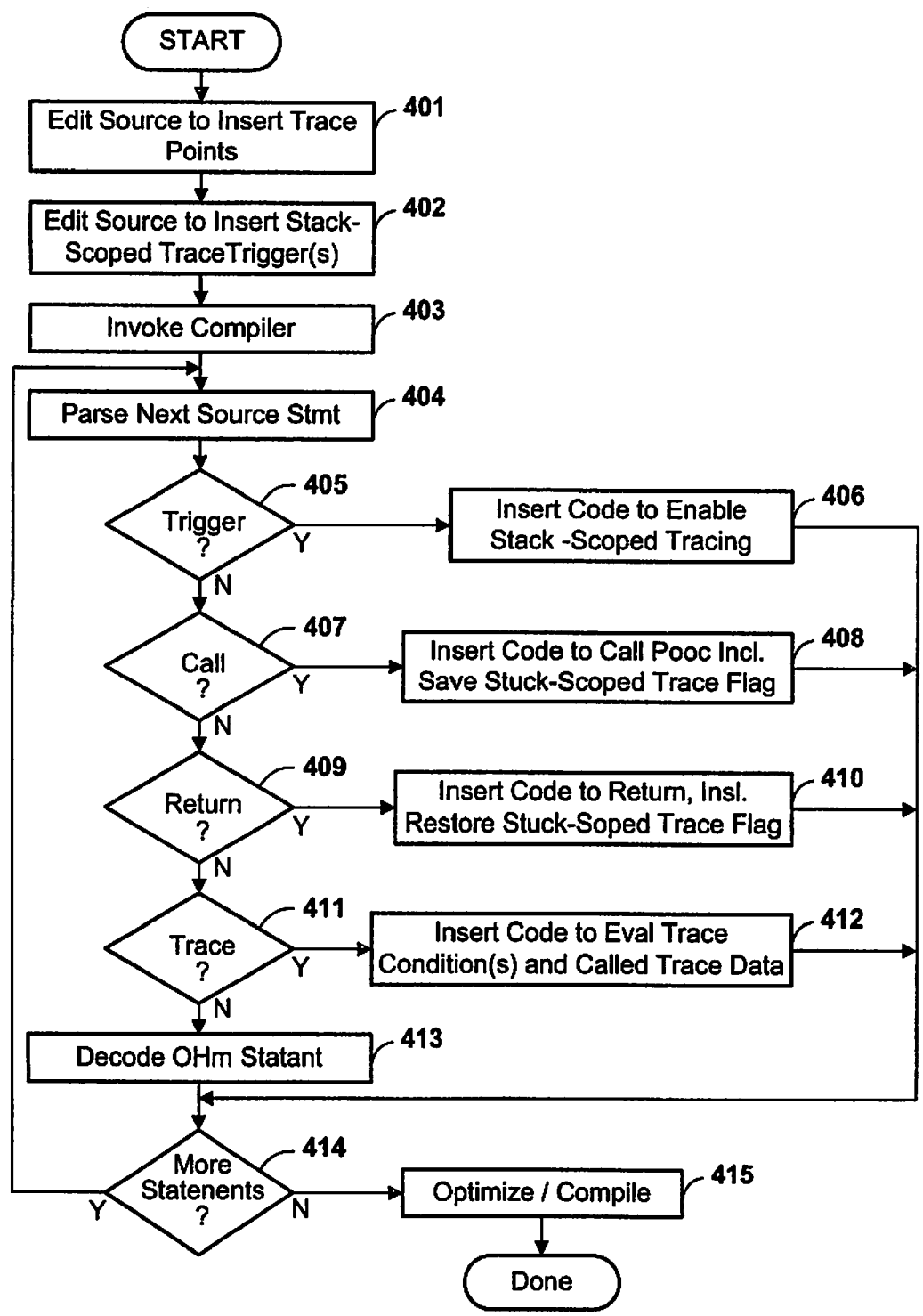
FIG. 4 is a high-level flow diagram showing the process of developing and preparing a computer program for trace data collection using stack-scoped tracing, according to the preferred embodiment.

FIG. 4 is a high-level flow diagram showing the process of developing a computer program 215 using integrated development environment 208 and preparing the program for later trace data collection using stack-scoped tracing. Referring to FIG. 4, a programmer creates and/or edits one or more source files 211 using source editor 202 to include multiple tracepoints for the collection of trace data (step 401). Source editing may be accomplished using any conventional technique, and is typically performed using an interactive on-screen editor. Portions of a source file or modules may be imported from source libraries or other applications, as is particularly common in the case of so-called object-oriented programming environments.

The programmer further creates or edits at least one source file to include at least one stack-scoped trace trigger statement (step 402). In the preferred embodiment, a stack-scoped trace trigger statement is a specially designed statement, inserted at a user chosen location in the source, which if encountered in the program execution will cause stack-coped tracing to be enabled, as described herein. When finished editing, the edited source file 211 is saved in storage for later compiling and further editing.

At some point later, the programmer invokes the compiler to compile one ore more source modules (step 403). The compiler (typically front end portion 203) successively examines and parses each source statement to determine an appropriate decoding (step 404). If the source statement is a stack-scoped trace trigger statement, the 'Y' branch from step 405 is taken, and the compiler inserts a code statements (which may include a call to a low-level function) to enable stack-scoped tracing for the currently active procedure instance and any procedure instances on the call stack (step 406). The behavior of such stack-scoped trace enabling code or routine when executed is described in greater detail herein with respect to FIG. 5. If the source statement is a call of a procedure, then the 'Y' branch from step 407 is taken, and the compiler inserts code statements (which may include a call to a low-level function) to save the current procedure's state on the program call stack 219 and invoke an new instance of the called procedure (step 408). This code is generally conventional in nature, with the addition of code to handle the stack-scoped trace enable flag 304 in the stack frame. The behavior of such a call when executed is described in greater detail herein with respect to FIG. 6. If the source statement is a return from a procedure, then the 'Y' branch from step 409 is taken, and the compiler inserts code statements (which may include a call to a low-level function) to terminate the procedure instance, pop the top entry from the call stack, and resume the calling procedure instance (step 410). This code is generally conventional in nature, and restores the previously saved stack-scoped trace enable flag as part of the active state. The behavior of such a return from a called procedure described in greater detail herein with respect to FIG. 7. If the source statement is a trace statement, then the 'Y' branch from step 411 is taken, and the compiler inserts code statements (which may include a call to a low-level function) to evaluate any trace conditions, including conditions involving stack-scoped tracing, and save appropriate state data where the trace conditions so indicate (step 412). The behavior of such a trace statement when executed is described in greater detail herein with respect to FIG. 8. If the parsed statement is neither a stack-scoped trace trigger, a procedure call, a return, nor a trace, then the statement is decoded and appropriate implementing code is inserted (step 413).

If any more statements remain to be parsed, the 'Y' branch is taken from step 414 and a next source statement is parsed at step 404. When all statements in the source have been processed, the 'N' branch is taken from step 414. The compiler (typically the back-end portion 204) then compiles and, if necessary, optimizes, the decoded source to produce executable code (step 415). It will be appreciated that FIG. 4 is a very simplified representation of the compilation process for purposes of illustrating certain features of the preferred embodiment, and that a compiler is a complex program which typically performs many other tasks to produce executable code.

During execution of program 215, a processor executes successive executable code statements within the program in a conventional manner, which may include calls to multiple procedure instances and returns from the same. In accordance with the preferred embodiment, conventional program behavior is modified with respect to the execution of the stack-scoped trace trigger, procedure calls, procedure returns, and trace statements, as explained below.

Figure 5:
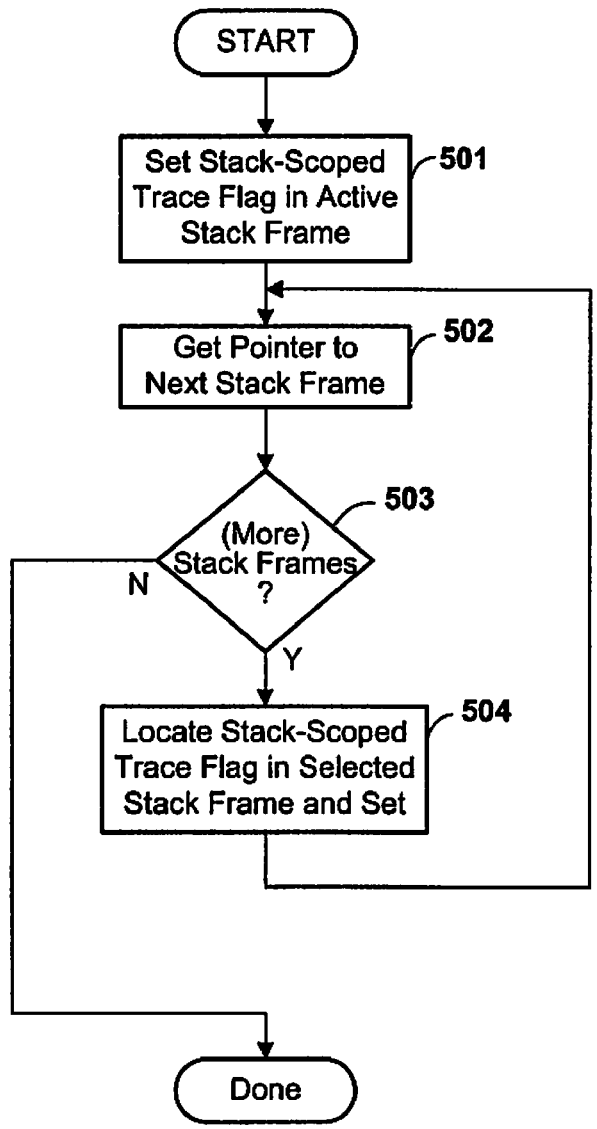
FIG. 5 is a flow diagram showing the process of executing a stack-scoped trace trigger during program execution, according to the preferred embodiment.

FIG. 5 is a flow diagram showing the process of executing a stack-scoped trace trigger when such a statement is encountered during program execution. Referring to FIG. 5, the stack scoped trace trigger is executed by setting the stack-scoped trace enable flag 304 for the active stack frame to 'true' (step 501). A stack pointer to the next frame on call stack 218 is retrieved (step 502). The stack pointer points to the stack frame 301 on the call stack immediately beneath the current frame. If no such frame exists (which may be indicated by a null stack pointer or other means, as by a stack pointer which points to a special location indicating the end of the stack), the 'N' branch is taken from step 503, and the process of executing the trigger statement ends. If the pointer points to an actual stack frame (the 'Y' branch from step 503), the location of the stack-scoped trace enable flag 304 within the frame is determined (preferably as a fixed offset from the beginning of the frame), and the flag 304 is set to 'true' (step 504). A pointer to the next stack frame is then obtained (step 502), and step 503 is repeated until no more stack frames remain.

It will be observed that the only actions taken on encountering the trigger are setting the various scack-scoped trace flags in the stack frames. I.e., a trigger does not necessarily cause any trace data to be collected. It merely enables tracing should a trace statement later be encountered. Of course, if a programmer wished to collect trace data immediately, he could place an appropriate trace statement immediately following the trigger statement in the code.

Figure 6:
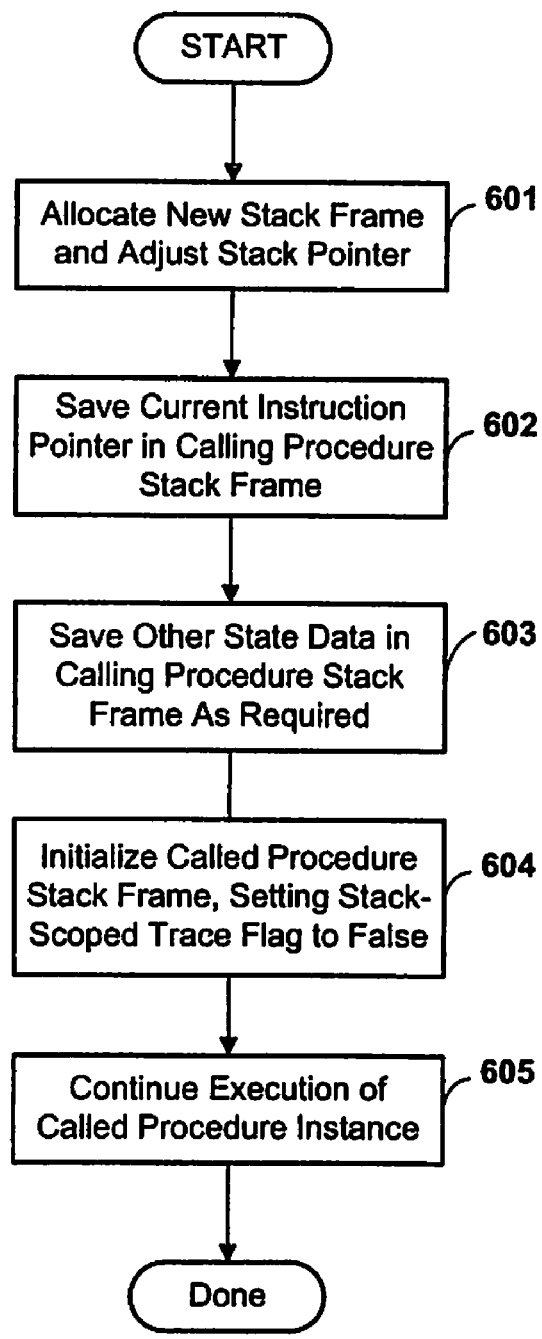
FIG. 6 is a flow diagram showing the process of executing a procedure call during program execution, according to the preferred embodiment.

FIG. 6 is a flow diagram showing the process of executing a procedure call when such a statement is encountered during program execution. In general, the procedure call follows a conventional process, with the addition of steps for maintaining the stack-scoped trace enable flags. In will be understood that FIG. 6 simplifies the process of executing a call, and other steps may be required in addition to those shown. Referring to FIG. 6, a procedure call is executed by allocating a new stack frame 301 on the call stack 218 for the newly called procedure instance, and adjusting the stack pointer accordingly to point to the new frame as the top of the stack (step 601). The current instruction pointer (at the point of the call) is saved on the stack frame of the calling procedure instance, i.e., the previously active stack frame (step 602). Additionally, various other state data for the calling procedure instance is saved in its stack frame as required to enable the calling procedure to be restored upon return from the procedure (step 603). The state data of the calling procedure includes its stack-scoped trace enable flag 304. The newly created stack frame for the called procedure is initialized, and in particular, the stack-scoped trace enable flag 304 in that stack frame (the new active stack frame) is initialized to 'false' (step 604). The instruction pointer is set to the first instruction of the called procedure, and program execution continues by executing the called procedure instance (step 605).

Figure 7:
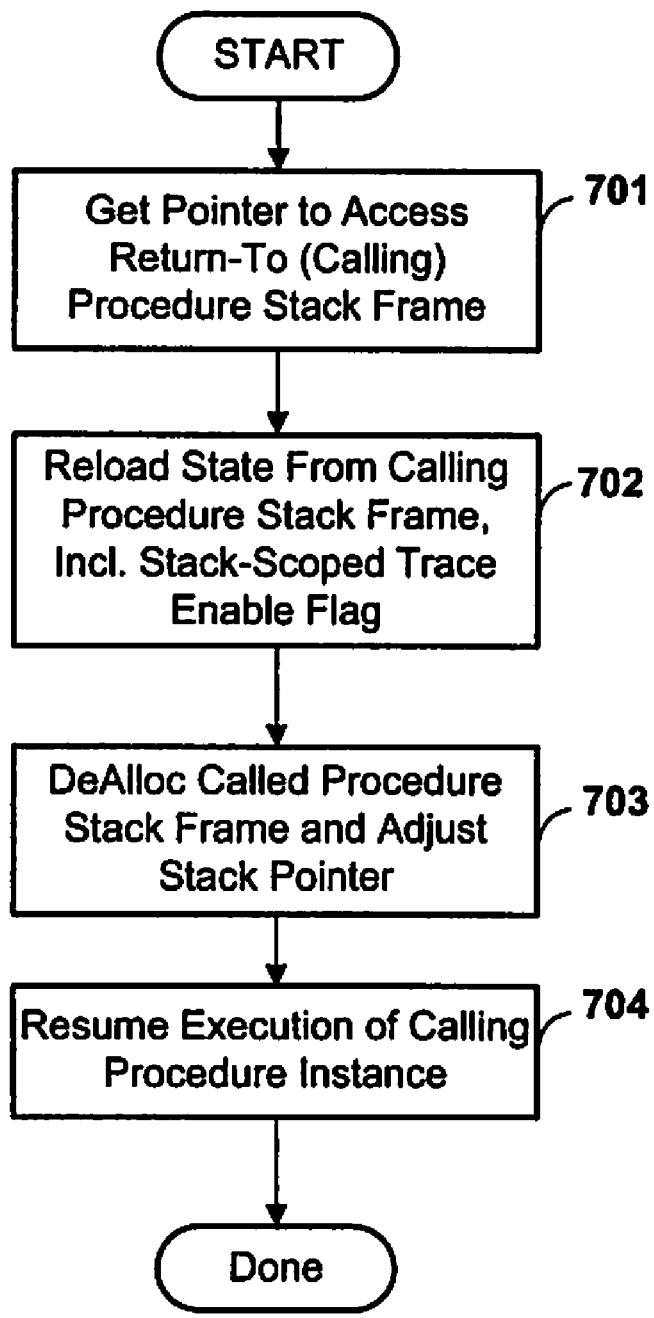
FIG. 7 is a flow diagram showing the process of returning from a called procedure during program execution, according to the preferred embodiment.

FIG. 7 is a flow diagram showing the process of executing a return from a called procedure when such a statement is encountered during program execution. Like the call, the return generally follows a conventional process; when state of the calling procedure is restored, its previously saved stack-scoped trace enable flag becomes part of the active state. Referring to FIG. 7, a return is executed by obtaining the pointer of the stack frame 301 for the procedure instance to be returned to (calling procedure), immediately beneath the called procedure (active procedure) on call stack 218 (step 701). The state of any required data is reloaded or obtained from the calling procedure stack frame; in particular, the previously saved stack-scoped trace enable flag 304 now becomes the active state stack-scoped trace enable flag (step 702). The stack frame at the top of the stack (previously active stack frame of the called procedure) is deallocated and the stack pointer adjusted to point to the stack frame immediately beneath it, i.e., the stack frame of the calling procedure (step 703). The instruction pointer is set to the first instruction following the previous procedure call from which return is taken, and execution of the called procedure instance resumes at this point (step 704).

Figure 8:
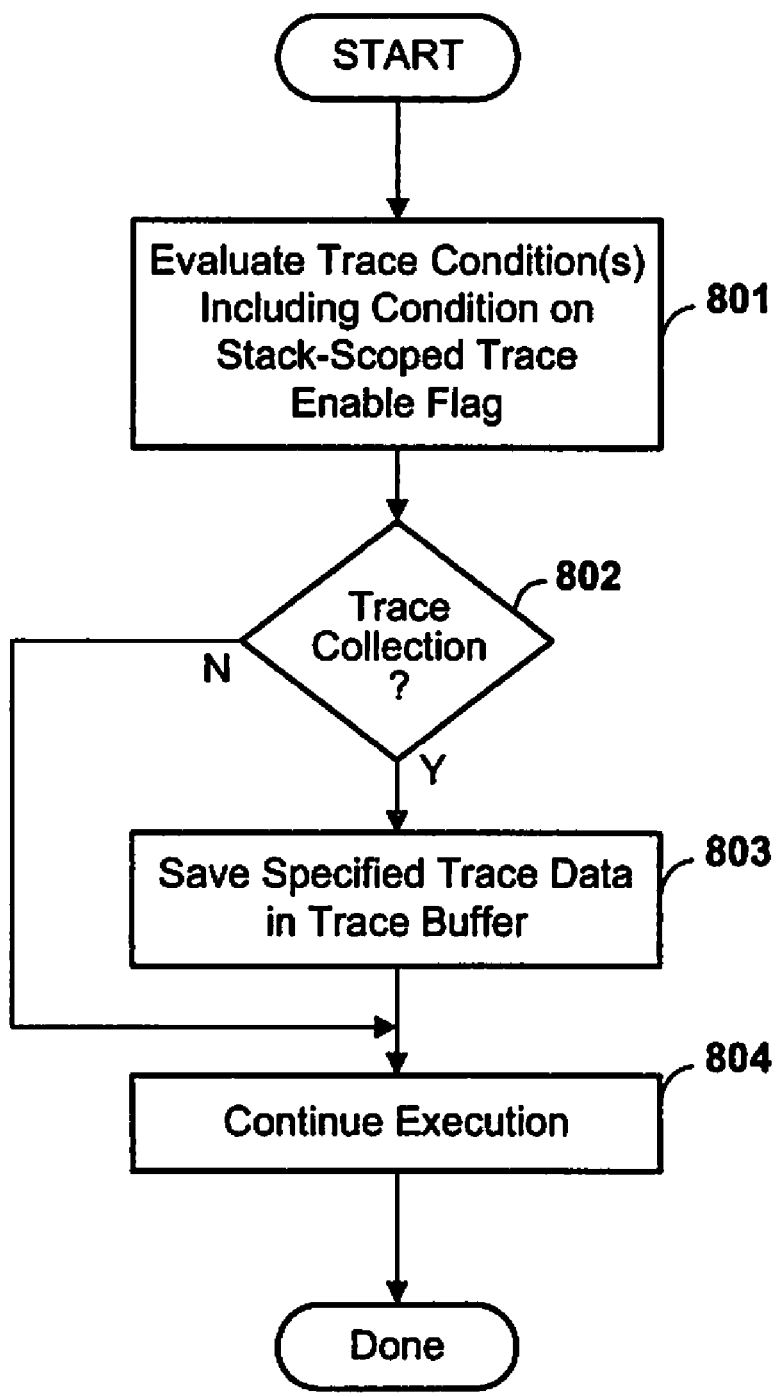
FIG. 8 is a flow diagram showing the process of executing a tracepoint statement during program execution, according to the preferred embodiment.

FIG. 8 is a flow diagram showing the process of executing a tracepoint statement when such a statement is encountered during program execution. Referring to FIG. 8, upon encountering the tracepoint, any conditions on the collection of trace data are evaluated (step 801). If the trace condition evaluates to 'true', the 'Y' branch is taken from step 802, and selective state data as specified by the trace statement is saved in trace buffer 219 for later analysis (step 803). If the trace condition evaluates to 'false', the 'N' branch is taken from step 802, and trace collection is by-passed. The program then continues execution (step 804)

In the preferred embodiment, at least one of the conditions evaluated at step 801 is a condition on the state of stack-scoped trace enable flag 304 in the active stack frame. This could be the only condition, or there could be multiple conditions attached to the collection of trace data, which are preferably expressed as a single logical expression in which the conditions are joined by logical operators such as 'AND' and 'OR'. Because there could be multiple conditions on the collection of trace data, the state of the stack-scoped trace enable flag 304 of the active stack frame is not necessarily determinative, but it at least forms a part of the logical determination whether to collect trace data. I.e., in at least some circumstances, trace data will be collected if the flag is 'true' and will not be collected if the flag is 'false'.

A simple example of the operation of the present invention will illustrate the capability to reduce the volume of extraneous trace data. A hypothetical program begins at a root procedure A, which calls procedure B, which calls procedure C. Procedure C contains a loop having a call to Procedure D, the loop executing 1000 times. On rare occasions, procedure D takes an abnormal path. In accordance with the preferred embodiment, a trigger is inserted in the abnormal path, and appropriate tracepoints placed at other interesting code locations to collect relevant data. In a particular execution session, procedure D executes normally on the first 614 iterations, and on the $615^{th}$ iteration takes the abnormal path, causing the trigger to be executed. Thereafter, the $615^{th}$ instance of procedure D is traced. However, if procedure D is called another 385 times, and does not take the abnormal path on these instances, procedure D will not be traced for the remaining 385 instances, resulting in trace data for procedure D only on the one instance in which it took an abnormal path. Procedures A, B and C, being on the stack at the time the trigger was encountered, will also be traced after the trigger is encountered. However, if another procedure E is called by B after returning from C, procedure E will not be traced. Thus, the volume of trace data is drastically reduced.

In general, it is desirable to know program state before the abnormal event rather than after it. For example, in the above example it may be desirable to know the state of procedure C at the time of the call to the $615^{th}$ instance of procedure D. This information can be obtained by inserting a tracepoint in procedure C at the point of return from the call. If any significant state data might be changed by procedure D, such state data could first be saved in a temporary variable or data structure which is not accessed by procedure D, and then conditionally collected as trace data upon return from procedure D.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network. Examples of signal-bearing media are illustrated in FIG. 1 as system memory 102, and as data storage devices 125-127.

In the preferred embodiment, both the tracepoints and the stack-scoped trace trigger are inserted into the source code and become part of the compiled executable code. It would alternatively be possible for the code to be developed conventionally without tracepoints or triggers, and to specify either or both the tracepoints and the triggers to trace utility 207. In this case, trace utility 207 would monitor execution for occurrence of the trigger, and upon occurrence of the trigger, would cause trace data to be collected for selective procedure instances only, as described above. I.e., trace utility could, by monitoring program execution, achieve essentially the same behavior with respect to the collection of trace data, although there may be greater performance overhead to using an external trace utility. As a further alternative, a trigger could be enabled as part of the run-time exception handling. I.e., if an exception is generated during execution, the exception handler could enable stack-scoped tracing by setting appropriate flags as described herein.

Although a specific embodiment of the invention has been disclosed along with certain alternatives, it will be recognized by those skilled in the art that additional variations in form and detail may be made within the scope of the following claims:

What is claimed is:

1. A method for tracing execution of a computer program, comprising the steps of:
    associating a trigger with a triggering event occurring during execution of said computer program;
    responsive to occurrence of said triggering event during execution of an instance of a procedure of said computer program, enabling a trigger-based tracing for a subset of procedure instances
    upon subsequent occurrence of a traceable event during execution of said computer program, making a determination whether to collect trace data, said determination being based at least in part on whether said trigger based tracing is enabled for a currently executing procedure instance; and
    collecting trace data responsive to said determination made by said step of making a determination whether to collect trace data;
    wherein said subset of procedure instances consists of all procedure instances on a call stack of said computer program when said triggering event occurred, including said triggering instance;
    wherein said step of enabling a trigger-based tracing for a subset of procedure instances comprises the step of marking each stack frame on a current call stack with an indication that the procedure instance corresponding to the stack frame is enabled for trigger-based tracing;
    wherein said step of enabling a trigger-based tracing for a subset of procedure instances comprises enabling trigger-based stack scoped tracing for a first instance of a calling procedure, and not enabling trigger-based tracing for a called procedure which is a second instance of the same procedure as the calling procedure, at least a respective portion of said first and second instances of said first procedure being executed after occurrence of said triggering event.

2. The method for tracing execution of a computer program of claim 1, wherein said step of associating a trigger with a triggering event comprises associating said trigger with a code location of said computer program, said triggering event comprising encountering said code location during execution of said computer program.

3. The method for tracing execution of a computer program of claim 2, wherein said step of associating a trigger with a code location comprises placing a trigger statement in source code of said computer program at said code location.

4. The method for tracing execution of a computer program of claim 1, wherein said traceable event comprises encountering a tracepoint.

5. A computer program product for tracing execution of a computer program, comprising:
    a plurality of executable instructions recorded on signal-bearing media, wherein said instructions, when executed by at least one processor of a digital computing device, cause the device to perform the steps of:
    associating a trigger with a triggering event occurring during execution of said computer program;
    responsive to occurrence of said triggering event during execution of an instance of a procedure of said computer program, enabling a trigger-based tracing for a subset of procedure instances;
    upon subsequent occurrence of a traceable event during execution of said computer program, making a determination whether to collect trace data, said determination being based at least in part on whether said trigger based tracing is enabled for a currently executing procedure instance; and
    collecting trace data responsive to said determination made by said step of making a determination whether to collect trace data;
    wherein said subset of procedure instances consists of all procedure instances on a call stack of said computer program when said triggering event occurred, including said triggering instance;
    wherein said step of enabling a trigger-based tracing for a subset of procedure instances comprises the step of marking each stack frame on a current call stack with an indication that the procedure instance corresponding to the stack frame is enabled for trigger-based tracing;
    wherein said step of enabling a trigger-based tracing for a subset of procedure instances comprises enabling trigger-based stack scoped tracing for a first instance of a calling procedure, and not enabling trigger-based tracing for a called procedure which is a second instance of the same procedure as the calling procedure, at least a respective portion of said first and second instances of said first procedure being executed after occurrence of said triggering event.

6. The computer program product of claim 5, wherein said computer program product comprises said computer program being traced, said instructions for performing the recited steps being embedded in the computer program being traced.

7. The computer program product of claim 5, wherein said step of associating a trigger with a triggering event comprises associating said trigger with a code location of said computer program, said triggering event comprising encountering said code location during execution of said computer program.

8. The computer program product of claim 7, wherein said step of associating a trigger with a code location comprises placing a trigger statement in source code of said computer program at said code location.

9. The computer program product of claim 5, wherein said traceable event comprises encountering a tracepoint.

10. A digital data system which traces execution of a program, comprising:
    at least one processor;
    a memory storing executable instructions of said program for execution on said at least one processor;
    a tracing capability for tracing execution of said computer program, said tracing capability embodied as instructions storable in said memory and executable by said least one processor, said tracing capability detecting occurrence of a triggering event during execution of said computer program, and responsive to detecting occurrence of said triggering event, enabling trigger-based tracing for a subset of procedure instances of said computer program, wherein upon a subsequent occurrence of a traceable event during execution of said computer program, trace data is collected depending at least in part on whether a currently executing procedure instance is a member of said subset of procedure instances;

wherein said subset of procedure instances consists of all procedure instances on a call stack when said triggering event occurred, including said triggering instance;

wherein said tracing capability enables trigger-based tracing for a subset of procedure instances by marking each stack frame on a current call stack with an indication that the procedure instance corresponding to the stack frame is enabled for trigger-based tracing;

wherein said tracing capability enables trigger-based tracing for a subset of procedure instances by enabling trigger-based stack scoped tracing for a first instance of a calling procedure, and not enabling trigger-based tracing for a called procedure which is a second instance of the same procedure as the calling procedure, at least a respective portion of said first and second instances of said first procedure being executed after occurrence of said triggering event.

11. The digital data system of claim 10, wherein said tracing capability is embodied as instructions embedded in said computer program being traced.

12. The digital data system of claim 10, wherein said triggering event comprises encountering at least one triggering instruction in the executable code of said computer program.

13. The digital data system of claim 10, wherein said traceable event comprises encountering at least one tracepoint instruction in the executable code of said computer program.

* * * * *